US010019503B2

(12) United States Patent
Bikkula et al.

(10) Patent No.: US 10,019,503 B2
(45) Date of Patent: Jul. 10, 2018

(54) DATABASE TRANSFERS USING CONSTRAINT FREE DATA

(75) Inventors: Ravi Bikkula, Sammamish, WA (US); Karthik Veeraswamy, Redmond, WA (US); Tewfik Zeghmi, Seattle, WA (US); Rajiv Poonamalli, Redmond, WA (US); Ullattil Shaji, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 367 days.

(21) Appl. No.: 12/975,367

(22) Filed: Dec. 22, 2010

(65) Prior Publication Data
US 2012/0166492 A1 Jun. 28, 2012

(51) Int. Cl.
G06F 7/00 (2006.01)
G06F 17/30 (2006.01)

(52) U.S. Cl.
CPC ...... *G06F 17/30584* (2013.01); *G06F 17/303* (2013.01); *G06F 17/30563* (2013.01)

(58) Field of Classification Search
CPC .................................. G06F 17/30563
USPC ................................ 707/694, 704
See application file for complete search history.

(56) References Cited

U.S. PATENT DOCUMENTS

| | | | | |
|---|---|---|---|---|
| 6,151,608 A * | 11/2000 | Abrams | ............... | G06F 17/303 707/679 |
| 6,208,990 B1 * | 3/2001 | Suresh | .............. | G06F 17/30563 |
| 7,010,538 B1 * | 3/2006 | Black | ............... | G06F 17/30516 707/636 |
| 7,020,656 B1 * | 3/2006 | Gong | ............... | G06F 17/30563 |
| 7,444,342 B1 * | 10/2008 | Hall | ................ | G06F 17/30592 |
| 7,634,477 B2 * | 12/2009 | Hinshaw | .......... | G06F 17/30477 |
| 7,702,610 B2 * | 4/2010 | Zane | ................ | G06F 17/30421 707/999.001 |
| 7,720,873 B2 * | 5/2010 | Loving | ............ | G06F 17/30297 707/802 |
| 7,779,042 B1 * | 8/2010 | Bland | ............... | G06F 17/30592 707/802 |
| 7,809,763 B2 * | 10/2010 | Nori | ................. | G06F 17/30297 707/609 |
| 8,086,998 B2 * | 12/2011 | Bansal | ..................... | G06F 8/10 707/756 |

(Continued)

OTHER PUBLICATIONS

"The Force.com Multitenant Architecture", Retrieved at << http://www.salesforce.com/au/assets/pdf/Force.com_Multitenancy_WP_101508.pdf >>, Whitepaper, 2008, pp. 16.

(Continued)

*Primary Examiner* — Eliyah S Harper (57) ABSTRACT

A database management tool may migrate a portion of a constrained database by transferring the portion to a constraint-free database from a first constrained database, then populating a second constrained database using the constraint-free data. The constraint-free data may be transformed prior to populating to update internal database identifiers. In some cases, the transformation may also update the data to a different schema of the target database. The database management tool may also include a load balancer that may monitor the loads on a distributed database and may separate portions of the database to different database instances to more effectively load balance the larger database.

17 Claims, 3 Drawing Sheets

(56) References Cited

U.S. PATENT DOCUMENTS

| | | | |
|---|---|---|---|
| 8,302,074 B1* | 10/2012 | Waldorf | G06F 17/3089 715/234 |
| 8,504,534 B1* | 8/2013 | Tendick | G06F 17/2264 707/694 |
| 9,740,992 B2* | 8/2017 | Fazal | G06Q 10/06 |
| 2002/0087516 A1* | 7/2002 | Cras et al. | 707/2 |
| 2003/0120593 A1* | 6/2003 | Bansal | G06F 17/30873 705/39 |
| 2003/0187888 A1* | 10/2003 | Hayward | 707/206 |
| 2005/0262188 A1* | 11/2005 | Mamou | G06F 17/30563 709/203 |
| 2007/0011175 A1* | 1/2007 | Langseth | G06F 17/30563 |
| 2008/0046536 A1* | 2/2008 | Broda | H04L 67/2842 709/217 |
| 2008/0189350 A1* | 8/2008 | Vasa | H04L 41/5003 709/201 |
| 2008/0256607 A1 | 10/2008 | Janedittakarn et al. | |
| 2008/0270363 A1* | 10/2008 | Hunt | G06F 17/30489 |
| 2009/0006146 A1* | 1/2009 | Chowdhary | G06F 17/30572 705/7.11 |
| 2009/0177672 A1* | 7/2009 | Fagin et al. | 707/100 |
| 2009/0198892 A1* | 8/2009 | Alvarez | G06F 12/0875 711/118 |
| 2010/0077449 A1 | 3/2010 | Kwok et al. | |
| 2010/0088636 A1 | 4/2010 | Yerkes et al. | |
| 2010/0153377 A1* | 6/2010 | Rajan | G06F 17/30528 707/723 |
| 2011/0161916 A1* | 6/2011 | Thomson | G06F 8/34 717/105 |
| 2012/0016909 A1* | 1/2012 | Narain et al. | 707/794 |
| 2012/0102007 A1* | 4/2012 | Ramasubramanian | G06F 17/30563 707/705 |

OTHER PUBLICATIONS

"Oracle SaaS Platform: Building On-Demand Applications", Retrieved at << http://www.oracle.com/us/technologies/cloud/026989.pdf >>, White Paper, Sep. 2008, pp. 21.

Chong, et al., "Multi-Tenant Data Architecture", Retrieved at << http://msdn.microsoft.com/en-us/library/aa479086.aspx >>, Jun. 2006, pp. 16.

"Architecting Scalable Multi-tenant Infrastructure with NetScaler VPX Virtual Appliances", Retrieved at << http://www.citrix.com/%2Fsite%2Fresources%2Fdynamic%2Fsaledocs%2FFlex_Tenancy_Multi_Tenancy.pdf >>, pp. 1-15.

Taylor, et al., "Data Integration and Composite Business Services, Part 3: Build multi-tenant data tier with access control and security", Retrieved at << http://www.ibm.com/developerworks/data/library/techarticle/dm-0712taylor/ >>, Dec. 13, 2007, pp. 16.

* cited by examiner

DATABASE TRANSFERS USING CONSTRAINT FREE DATA

BACKGROUND

Some large scale applications may operate by dividing a large database into smaller segments, where each of the segments may be assigned to different database instances, each of which may be on a different hardware platform. A router may receive a request for the database, determine which instance of the database may handle the request, and pass the request to the particular instance for processing.

In a simple example of such a database, a large database may be divided based on the first letter of a record. All of the records beginning with "A" may be on one server, all the records beginning with "B" may be on another server, etc. Problems may arise in managing the database when the first server may become full and may not be able to store additional records.

SUMMARY

A database management tool may migrate a portion of a distributed database by transferring the portion to a constraint-free database from a first constrained database, then populating a second constrained database using the constraint-free data. The database records in the constraint-free database may be transformed prior to populating the second constrained database. In some cases, the transformation may include updating the data to a different schema compatible with the second database. The database management tool may also include a load balancer that may monitor the loads on a distributed database and may separate segments of the database to different database instances to more effectively load balance the larger database.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A distributed database system may be managed by moving portions of the database from one database instance to another. The portions may be moved from a constrained database into a constraint free database. The database portions may then be transformed within the constraint free database to update database indexes or other identifiers, then the contents of the constraint free database may be used to populate a second database instance which may be a constrained database.

The moving operation may be performed as part of a management system for distributed databases. The moving operation may be used to balance the database loads as well as migrate the database to new schemas or other upgrades.

The management system may monitor the various database instances within the distributed database to identify those instances that may be running out of room or may be too frequently accessed. Based on the monitoring, some of the database records may be offloaded from a highly loaded database instance to an instance that may be less loaded or to a new instance altogether.

A distributed database system may have a router that may distribute client requests to the individual database instances that may contain the data being requested. The load balancer may use a database topology definition to determine which database instances contain which data. When a portion of one database instance is moved to a new instance, the database topology definition may be updated so that future requests for the records within the moved database portion may be redirected to the new location of the records. Once an update may be made to the database topology, the records may be deleted from the first instance.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and maybe accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Figure 1:
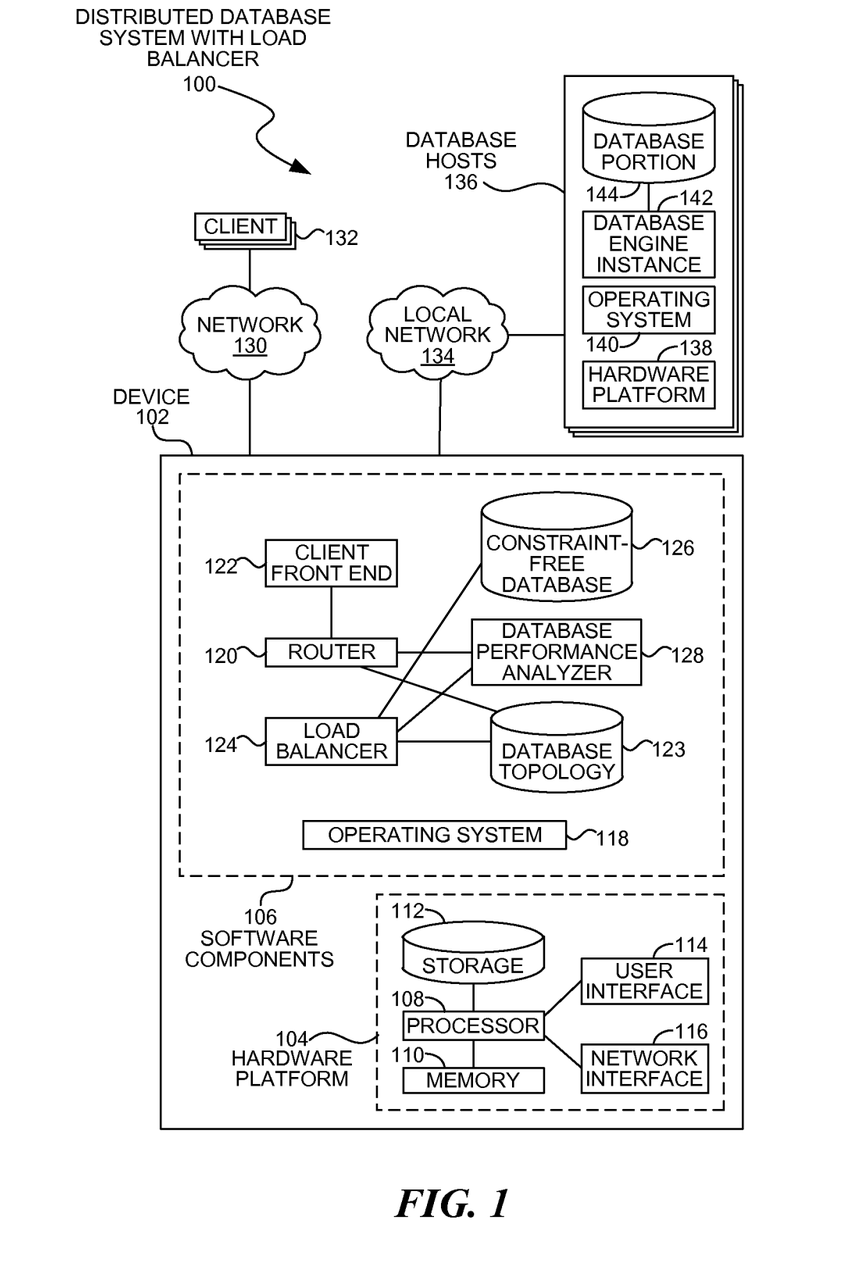
FIG. 1 is a diagram illustration of an embodiment showing a network environment with a distributed database.

FIG. 1 is a diagram of an embodiment 100, showing a system that may move portions of a distributed database from one database instance to another by using a constraint free database. Embodiment 100 is a simplified example of a distributed database system with a load balancer.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 illustrates an example of a distributed database system. The distributed database system may have multiple database instances which each may operate on a separate hardware platform. Each database instance may contain a fraction of the overall database. A router may receive client requests and route the requests to the database instance that may contain a subset of the large database that may service the database request.

In one use scenario, a load balancer may move portions of the database from one database instance to another so that overloaded or over capacity database instances may be unloaded.

In a simple example, a database that may have phone numbers may have a separate database instance for each letter of the alphabet. For requests beginning with the letter "A", the first database instance may contain all of the records, similarly, a second database instance may contain all of the records beginning with the letter "B".

In the example, the database instance with the "A" records may become full or heavily loaded. A segment of the "A" database may be moved to a new server. The segment may be the records from "Aa" to "Am", for example. After moving the records, the previous "A" server may service only the records from "An" to "Az" and the new server may service records from "Aa" to "Am".

In another use scenario, the mechanism to move portions of the database may be used to upgrade the database, change database schemas, or other maintenance purposes. In such a scenario, a new or updated database instance may be the recipient when moving database records. The records may be moved out of an old database instance into a constraint-free database, then transformed in the constraint-free database to the new schema or may have other transformations performed. After the transformation, the database records may be imported into the new database instance.

For a large distributed database, the scenario causes database instances to be migrated one instance at a time to roll out changes to the database. During the migration period, a majority of the overall database may remain operational and may service requests, although the records being moved may be unavailable for the short period of time during the move operation.

The device 102 may perform several management functions for a distributed database. The device 102 may perform basic routing by processing incoming requests, as well as to load balance the data within the database instances by moving portions of the data from one database instance to another.

The device 102 is illustrated having hardware components 104 and software components 106. The device 102 as illustrated represents a conventional server computer, although other embodiments may have different configurations, architectures, or components.

In many embodiments, the device 102 may be a server computer. In some embodiments, the device 102 may still also be a laptop computer, netbook computer, tablet or slate computer, wireless handset, game console, cellular telephone, or any other type of computing device.

The hardware components 104 may include a processor 108, random access memory 110, and nonvolatile storage 112. The hardware components 104 may also include a user interface 114 and network interface 116. The processor 108 may be made up of several processors or processor cores in some embodiments. The random access memory 110 may be memory that may be readily accessible to and addressable by the processor 108. The nonvolatile storage 112 may be storage that persists after the device 102 is shut down. The nonvolatile storage 112 may be any type of storage device, including hard disk, solid state memory devices, magnetic tape, optical storage, or other type of storage. The nonvolatile storage 112 may be read only or read/write capable.

The user interface 114 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 116 may be any type of connection to another computer. In many embodiments, the network interface 116 may be a wired Ethernet connection. Other embodiments may include wired or wireless connections over various communication protocols.

The software components 106 may include an operating system 118 on which various applications and services may operate. An operating system may provide an abstraction layer between executing routines and the hardware components 104, and may include various routines and functions that communicate directly with various hardware components.

The applications executing on the operating system 118 may include a router 120. A client front end 122 may communicate with various client devices 132 available over a network 130 to receive various database requests. The router 120 may route the requests to an appropriate database instance that may contain the data being requested. The router 120 may use a database topology 123 to locate the database instance that corresponds with the request. Once the database request is routed to the appropriate database instance, the request may be processed and a response transmitted back to the requesting client.

The device 102 may contain a database performance analyzer 128 that may collect performance information from the various database instances. The database performance analyzer 128 may identify portions of the database that may be moved from one database instance to another.

A load balancer 124 may perform a move by transferring database records from one database instance to another. When a move takes place, the database records may be transferred from a first database instance into a constraint-free database 126. The first database instance may be a conventional relational database where various tables may have constraints between them. While in the constraint-free database 126, the database records may be transformed. In some cases, the transformation may involve reassigning the data identifiers or keys to those compatible with the second database instance.

In some cases, the transformation may involve changing the schema associated with the data. One use scenario may be to upgrade the database from one schema to another. A new database instance may be created using the new schema, and database records from another database instance may be retrieved and transformed in the constraint-free database 126. After the transformation that may make the data records compatible with the new schema, the data records may be imported or transferred into the new database instance. After clearing all of the data records in the previous database instance, that database instance may be upgraded to the new schema and may begin accepting database records from another older database instance. In such a manner, the database may be migrated in stages from one schema to another.

Various database hosts 136 may be available over a local network 134. The database hosts 136 may be server computers or other computers that host segments of a larger database. Each of the database hosts 136 may have a hardware platform 138 and an operating system 140. Within the operating system 140, a database engine instance 142 may service a database segment 144.

The database hosts 136 may operate by each database host handling a different section or segment of a larger database. For very large databases, such as Internet search engines or large scale applications, the database hosts 136 may be server computers in a datacenter. In other embodiments, the database hosts 136 may be personal computers, game consoles, or other computing devices that may host database services that may be centrally managed. In one such embodiment, a database service may be hosted by a user's home computer and may consume excess computing resources when a user is not using the home computer. In such an embodiment, the network 134 may be a wide area network, such as the Internet.

When the database hosts 136 are located within a datacenter, the network 134 may be a local network. In such an embodiment, the clients 132 may access the database by communicating with the client front end 122 through an external network 130. The external network 130 may be the Internet or other wide area network.

In some embodiments, the local network 134 may be separate from the network 130 and all information passed between a client 132 and a database engine instance 142 may pass through the device 102. In other embodiments, a request may be received from a client 132 and passed to one of the database hosts 136. The database host 136 may then respond directly to the client 132 without having to pass the response through the device 102.

In some embodiments, the operating system 140 may be within a virtual machine. A virtual machine may be a software implementation of a hardware computer, and may allow the virtual machine to be executed on various hardware platforms. In a datacenter environment, virtual machines may be used to move computing workloads from one hardware platform to another, to consolidate multiple workloads on a single hardware platform, or other management tasks.

Figure 2:
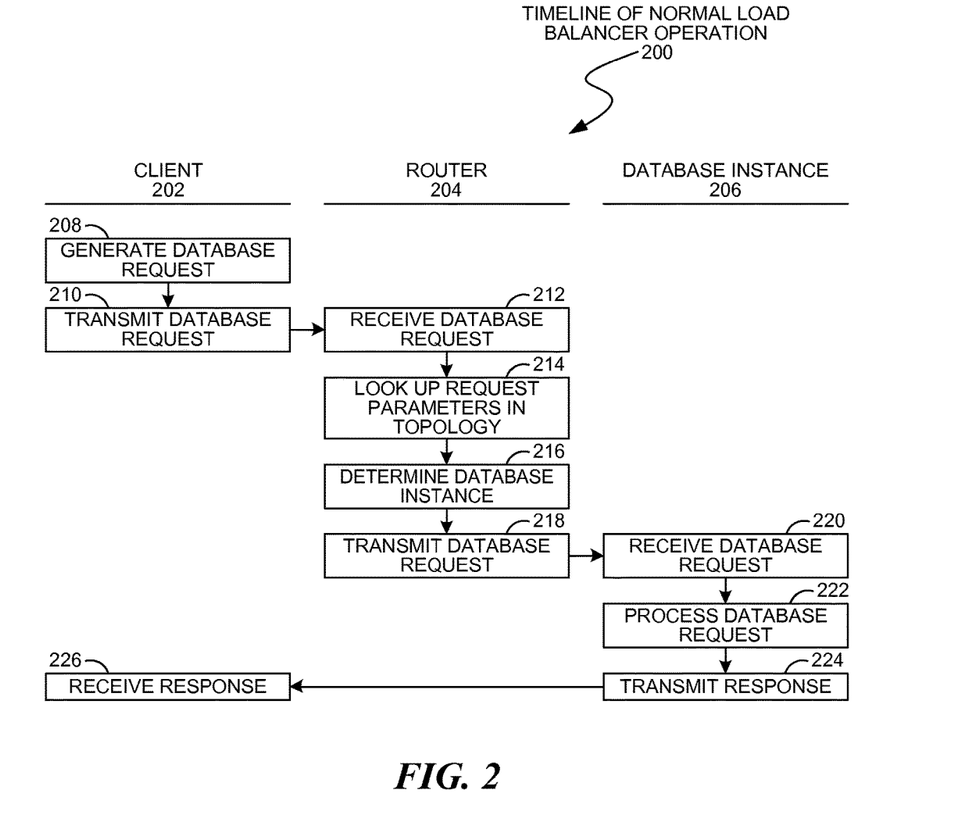
FIG. 2 is a timeline illustration of an embodiment showing a method for normal operation of a load balancer.

FIG. 2 is a timeline illustration of an embodiment 200 showing a method for normal operation of a router in a distributed database system. The left hand column may show operations of a client device 202. Operations of a router 204 may be shown in the center column, and the right hand column may show the operations of a database instance 206.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 may show the operations that may route requests from a client device 202 to a database instance 206. In a distributed database system, a large database may be broken into smaller segments, where the collection of segments may make up the entire database.

The distributed database of embodiment may be one in which data may not be duplicated on multiple device. Each of the segments of the database may be hosted by one or more hardware platforms. The segments may be separate portions of the larger database and may not overlap, so that certain records are only in one segment.

In some embodiments, a segment may be served by two or more database instances that operate duplicate copies of the segment. Such implementations may be used for redundancy and fault tolerance, increased throughput, or other purposes.

In block 208, the client 202 may generate a database request. In block 210, the database request 210 may be transmitted to the router 204.

The router 204 may receive the database request in block 212 and may look up the request in a topology definition to determine which segment of the database may contain the requested data. The database instance may be determined in block 214.

The database request may be transmitted in block 218 to the database instance 206, which may be received by the database instance 206 in block 220. The database instance 206 may process the request in block 222 and transmit a response in block 224. The response may be received by the client 202 in block 226, thereby completing the request.

Figure 3:
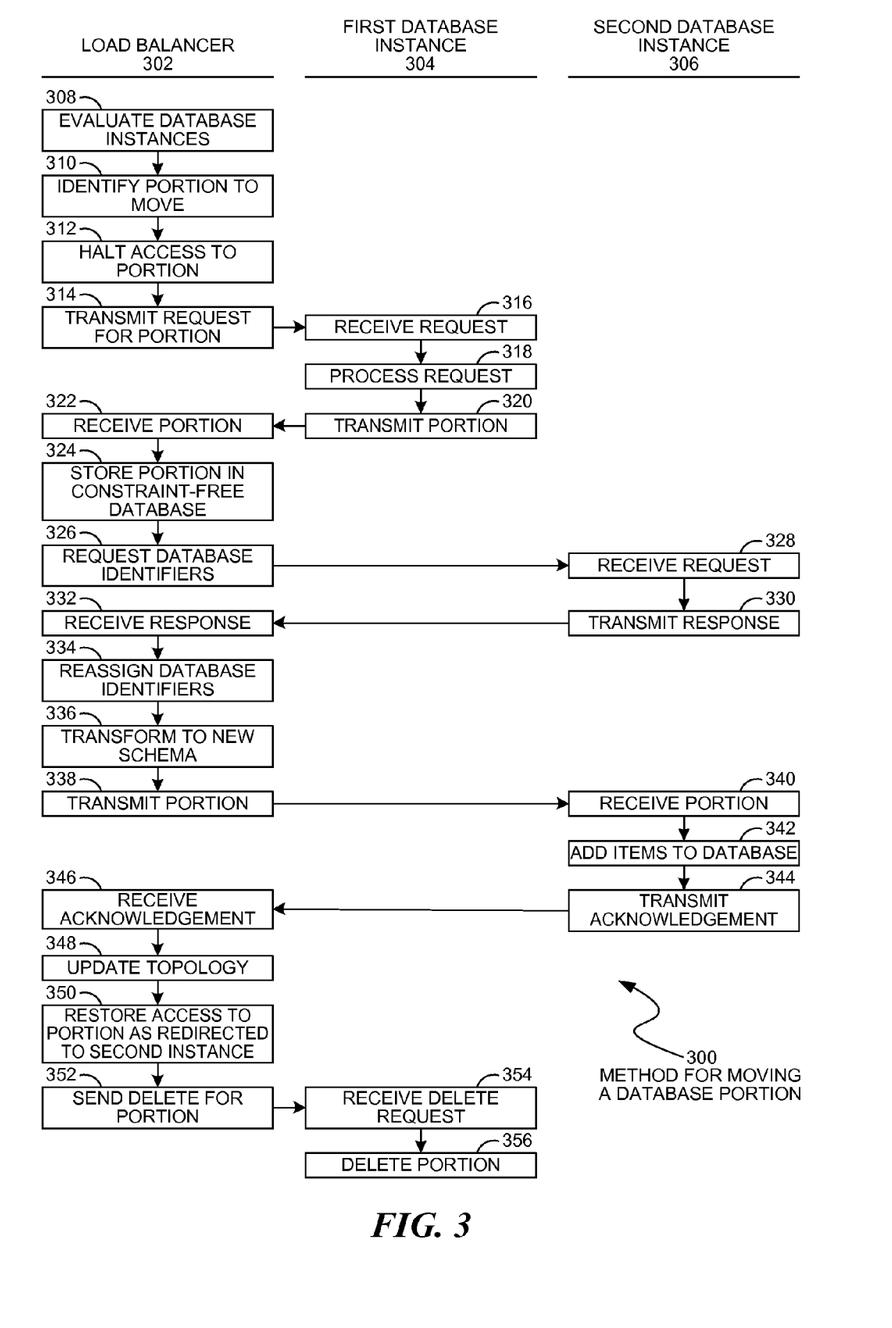
FIG. 3 is a timeline illustration of an embodiment showing a method for moving a database portion.

FIG. 3 is a timeline illustration of an embodiment 300 showing a method for moving a database portion from one database instance to another. The left hand column may show operations of a load balancer 302. Operations of a first database instance 304 may be shown in the center column, and the right hand column may show the operations of a second database instance 306.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 may illustrate one method by which portions of a database may be moved from one database instance to another. The process of embodiment 300 may be performed by a load balancer portion of a database management system.

The load balancer 302 may evaluate database instances in block 308 and may identify a portion of the first database instance 304 to move in block 310.

The load balancer 302 may move all or a portion of the records contained in one database instance to another database instance in various scenarios. In a load balancing scenario, the load balancer 302 may evaluate various segments of a distributed database to identify certain segments that may be experiencing higher usage than other segments. The load balancer may identify frequently accessed records and may spread the frequently accessed records to other database instances that are less lightly loaded.

In another use scenario, the load balancer 302 may examine various database instances to identify one or more database instances that are growing near their storage capacity. In such a use scenario, the load balancer 302 may move records off of a database instance and place those records onto a new database instance or one having unused storage capacity.

In still another use scenario, the load balancer 302 may migrate a database instance to another version, another schema, or perform some other upgrade or change to the underlying system. In such a use scenario, the load balancer 302 may transform the data prior to populating the new database instance. The transformation may include updating the schema or performing any other transformation.

In block 310, the portion of the database to be transferred may be identified. The portion may include some or all of the records stored in the first database instance 304. Access to the portion may be halted in block 312. In some embodiments, access to the portion may be halted by modifying a database topology so that a router may not allow access to the records. In some embodiments, read access to the portion may be allowed, but write access may be denied. The read access may continue to be served during a migration operation.

In block 314, the load balancer 302 may transmit a request for the portion of the database that will be moved. The first database instance 304 may receive the request in block 316, process the request in block 318, and transmit the records contained in the database portion in block 320.

The load balancer 302 may receive the portion in block 322 and may store the portion in a constraint-free database in block 324.

The load balancer 302 may transmit a request in block 326 for database identifiers. The second database instance 306 may receive the request in block 328 and transmit a response in block 330.

The load balancer 302 may receive the response in block 332. The database identifiers may be keys used within a database instance to identify each record. In many embodiments, the keys within a database instance may not be duplicated. In such embodiments, the load balancer 302 may reassign database identifiers to those records in the constraint-free database in block 334.

In some cases, the load balancer 302 may perform additional transformations to the data in the constraint-free database in block 336, which may include transforming the records to conform to a new schema.

The portion may be transmitted in block 338 to the second database instance 306, which may receive the portion in block 340. The records may be added to the database in block 342. After processing the new records into the second database instance 306, an acknowledgement may be transmitted in block 344.

The acknowledgement may be received in block 346. The acknowledgement may indicate that the records have been successfully transmitted and that the second database instance 306 may be ready to process requests for the data.

The load balancer 302 may update the database topology for the router in block 348, and access to the portion of the database may be restored in block 350. Because the database topology may have been updated, any new requests for the portion may be directed to the second database instance 306 rather than the first database instance 304. At this point, the records may be available and the database may resume operations.

In block 352, the load balancer 302 may transmit a delete request to the first database instance 304. The first database instance 304 may receive the delete request in block 354 and may delete the moved records in block 356.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method for use at a computer system, the method comprising:
monitoring performance of a first database instance and a second database instance of a distributed database when data that spans a first table and a second table is accessed from the distributed database;
determining that operational load at the first database instance is adversely impacting access to the data based on the monitored performance;
offloading a data portion of the data from the first database instance to the second database instance, including:
determining that the data portion is to be moved out of the first database instance to a constraint free database for dispositioning into the second database instance based on the monitored performance, the data portion spanning the first table and the second table, parts of the data portion in the first table and parts of the data portion in the second table having defined constraints between them, the data portion having database identifiers assigned to and compatible with the first database instance;
transferring the data portion from the first table and the second table to the constraint free database, the constraint free database eliminating the defined constraints between the first table and the second table;
accessing database identifiers for the second database instance, the accessed identifiers assigned to and compatible with the second database instance;
applying at least one transformation to the data portion stored in the constraint free database to transform the data portion into a transformed data portion, transforming the data portion including formatting the data portion for storage in the second database instance by reassigning database identifiers within the data portion to the accessed database identifiers; and
transmitting the transformed data portion from the constraint free database for storage into the second database instance using the reassigned database identifiers, the transformed data portion spanning a first table and second table in the second database instance, the first table and second table in the second database instance having different constraints and corresponding to the first table and second table in the second database instance.

2. The method of claim 1, wherein applying at least one transformation comprises applying a transform to the data portion to transform the data portion for compatibility with a new schema, the new schema defining new constraints between the first table and the second table; and
wherein transmitting the transformed data comprising transmitting the transformed data for storage within the first table and the second table in the second database instance in accordance with the defined new constraints.

3. The method of claim 1, wherein applying at least one transformation comprises applying a transformation to the data portion for compatibility with an upgrade to operation of the distributed database.

4. The method of claim 3, further comprising performing at least one additional transformation on the data portion prior to transmitting the transformed data portion for storage into the second database instance.

5. The method of claim 1, wherein the first database instance is a relational database and the second database instance is a relational database.

6. The method of claim 1 further comprising:
preventing access to the data portion in the first database instance after transferring the data portion to the constraint free database and prior to transmitting the transformed data portion for storage into the second database instance.

7. The method of claim 6 further comprising:
allowing access to a second different data portion stored in the first database instance while preventing access to the data portion.

8. The method of claim 7 further comprising:
removing the data portion from the first database instance after transmitting the transformed data portion for storage into the second database instance.

9. The method of claim 1, wherein applying at least one transformation comprising performing part of a multi stage update to the operation of the distributed database.

10. A system comprising:
one or more hardware processors;
system memory coupled to the one or more hardware processors, the system memory storing instructions that are executable by the one or more hardware processors;
the one or more hardware processors executing the instructions stored in the system memory to:
monitor performance of a first database instance and a second database instance of a distributed database when data that spans a first table and a second table is accessed from the distributed database;
determine that operational load at the first database instance is adversely impacting access to the data based on the monitored performance;
offload a data portion of the data from the first database instance to the second database instance, including:
determine that the data portion is to be moved out of the first database instance to a constraint free database for dispositioning into the second database based on the monitored performance, the data portion spanning the first table and the second table, parts of the data portion in the first table and parts of the data portion in the second table having defined constraints between them, the data portion having database identifiers assigned to and compatible with the first database instance;
transfer the data portion from the first table and the second table to the constraint free database, the constraint free database eliminating the defined constraints between the first table and the second table;
access database identifiers for the second database instance, the accessed identifiers assigned to and compatible with the second database instance;
apply at least one transformation to the data portion in the constraint free database to transform the data portion into a transformed data portion, transforming the data portion including formatting the data portion for storage in the second database instance by reassigning database identifiers within the data portion to the accessed database identifiers; and
transfer the transformed data portion from the constraint free database for storage into the second database instance using the reassigned database identifiers, the transformed data portion spanning a first table and a second table in the second database instance, the first table and second table in the second database instance having different constraints and corresponding to the first table and second table in the second database instance.

11. The system of claim 10 further comprising the one or more hardware processors executing the instructions stored in the system memory to:
subsequent to transferring the transformed data portion for storage into the second database instance, receive a request for the data portion;
determine that the transformed data portion is stored in the second database instance by referring to a database topology; and
route the request to the second database instance.

12. The system of claim 11, further comprising the one or more hardware processors executing the instructions stored in the system memory to:
update a routing table to associate the data portion with the second database instance.

13. The system of claim 10, wherein the one or more hardware processors executing the instructions stored in the system memory to apply at least one transformation to the data portion comprises the one or more hardware processors executing the instructions stored in the system memory to apply a transformation to the data portion for compatibility with a new schema, the new schema defining new constraints between the first table and the second table.

14. The system of claim 13, wherein the one or more hardware processors executing the instructions stored in the system memory to transfer the transformed data comprising one or more hardware processors executing the instructions stored in the system memory to transfer the transformed data for storage within the at least a first table and a second table in accordance with the defined new constraints.

15. The system of claim 10, further comprising the one or more hardware processors executing the instructions stored in the system memory to remove the data portion from the first database instance after transmitting the transformed data portion for storage in the second database instance.

16. The system of claim 10, wherein the one or more hardware processors executing the instructions stored in the system memory to apply at least one transformation to the data portion in the constraint free database to transform the data portion into a transformed data portion comprise the one or more hardware processors executing the instructions stored in the system memory to perform part of a multi stage update to the operation of the distributed database.

17. The system of claim 10, wherein the one or more hardware processors executing the instructions stored in the system memory to apply at least one transformation to the data portion in the constraint free database to transform the data portion into a transformed data portion comprise the one or more hardware processors executing the instructions stored in the system memory to apply a transformation to the data portion for compatibility with an upgrade to operation of the distributed database.

* * * * *